United States Patent
Gibbs et al.

(10) Patent No.: US 6,631,315 B1
(45) Date of Patent: Oct. 7, 2003

(54) AIRCRAFT SIGNAL DEFINITION FOR FLIGHT SAFETY SYSTEM MONITORING SYSTEM

(75) Inventors: Michael Gibbs, Phoenix, AZ (US); Debi Van Omen, Scottsdale, AZ (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 10/099,650

(22) Filed: Mar. 14, 2002

(51) Int. Cl.[7] ................................................ G06F 7/00
(52) U.S. Cl. ........................... 701/29; 701/3; 244/158 R
(58) Field of Search ........................... 701/1, 3, 29, 33, 701/34; 244/158 R, 75 R, 194

(56) References Cited

U.S. PATENT DOCUMENTS 3,581,014 A * 5/1971 Alvin et al. .................. 369/21
4,442,491 A * 4/1984 Olhausen, Jr. ............... 701/221
5,075,881 A * 12/1991 Blomberg et al. ............. 703/2

* cited by examiner

Primary Examiner—Gertrude Arthur (57) ABSTRACT

A system and method compares combinations of vehicle variable values against known combinations of potentially dangerous vehicle input signal values. Alarms and error messages are selectively generated based on such comparisons. An aircraft signal definition is provided to enable definition and monitoring of sets of aircraft input signals to customize such signals for different aircraft. The input signals are compared against known combinations of potentially dangerous values by operational software and hardware of a monitoring function. The aircraft signal definition is created using a text editor or custom application. A compiler receives the aircraft signal definition to generate a binary file that comprises the definition of all the input signals used by the monitoring function. The binary file also contains logic that specifies how the inputs are to be interpreted. The file is then loaded into the monitor function, where it is validated and used to continuously monitor the condition of the aircraft.

29 Claims, 6 Drawing Sheets

| | | THRUST | | |
|---|---|---|---|---|
| | | IDLE | MEDIUM | HIGH |
| SPEEDBRAKES | IN | | | |
| | OUT | ADVISORY | CAUTION | WARNING |
| | HIGH | ADVISORY | CAUTION | WARNING |

INFORMATION REQUIREMENTS: ALERT PILOTS IF SPEEDBRAKES ARE OUT WITH HIGH THRUST SELECTED

610 — CONDITION AND NAME ID
```
condition "Low Altitude w/Medium Descent Rate", 10
; An intermediate downward vertical speed near the
; grounf (below 5,000 feet AGL) should be annunciated.
```

620 — INPUTS REQUIRED TO DETECT CONDITION
```
inputs
  verticalSpeed = TRACSAirData.VspData, float 32
  radarAltitude = TRACSAirData.RaData, float 32
  airspeed      = TRACSAirData.ImCasData, float 32
```

630 — TRIGGERING AND TIMING LOGIC
```
trigger when
  (airspeed > gMaxFlapSpeed) and
  (verticalSpeed < kVertSpdNeg) and
  (radarAltitude < kLowAltitude)
  exists for 10 seconds
  reset after 5 seconds
```

640 — NUISANCE SUPPRESSION CLAUSE
```
inhibited by condition 9
removed by condition 9
```

650 — ACTIONS TO BE TAKEN
```
actions
  caution message "Check altitude"
endCondition
```

FIG. 6

AIRCRAFT SIGNAL DEFINITION FOR FLIGHT SAFETY SYSTEM MONITORING SYSTEM

CROSS REFERENCE TO RELATED APPLICATIONS

This application is related to copending US application: "Flight Safety System Monitoring Combinations of State Values", U.S. Ser. No. 10/098,275, filed on the same date herewith and assigned to the same assignee.

GOVERNMENT FUNDING

The invention described herein was made with U.S. Government support under Cooperative Research Agreement Number NCC-1-339 awarded by NASA. The United States Government has certain rights in the invention.

FIELD OF THE INVENTION

The present invention relates to flight safety, and in particular to a flight safety system that monitors sets of state values to provide warnings of potentially unsafe situations.

BACKGROUND OF THE INVENTION

Controlled Flight Into Terrain (CFIT) accidents have received much attention recently, but most attempts to address them have concentrated on making flight crews more aware of terrain. However, a study of recent accidents suggests that many are caused by factors unrelated to terrain. Many such accidents are near airports, where conventional terrain avoidance/warning systems are ineffective due to the inherent lower altitude of the plane required for landing. Such conventional systems usually rely upon a measurement of one parameter.

In one example, a wrong descent mode is thought to have been selected. While the crew selected a parameter for a flight path angle, it was applied to a vertical speed mode of descent. The parameter was too great for such a mode, likely causing the accident. In a further example, it was not realized that a first officer's flight director was still selected and the autoflight system was following Flight Director guidance. In one more example, a crew failed to retract speedbrakes when attempting to climb out of a canyon.

SUMMARY OF THE INVENTION

An aircraft signal definition is provided to enable definition and monitoring of sets of aircraft input signals to customize such signals for different aircraft. The input signals are compared against known combinations of potentially dangerous input signal values by operational software and hardware of a monitoring function. The aircraft signal definition is created using a text editor or custom application.

A compiler receives the aircraft signal definition to generate a binary file that comprises the definition of all the input signals used by the monitoring function. The binary file also contains logic that specifies how the inputs are to be interpreted. The file is then loaded into the monitoring function, where it is validated and used to continuously monitor the condition of the aircraft.

Undesirable input value combinations describing the state of an aircraft are initially identified by experts. Error messages and identification of potential alarms are generated based on both knowledge of actual accidents, and on use of expert knowledge to predict potentially dangerous states. The combinations are entered into the aircraft signal definition for use by the monitoring function. Different aircraft signal definitions are written for different aircraft, and are useable with identical monitoring functions.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Use of a system that compares combinations of values of states of a vehicle such as an aircraft to previously identified unsafe combinations is described, followed by a section describing a methodology of determining the unsafe combinations.

Figure 1:
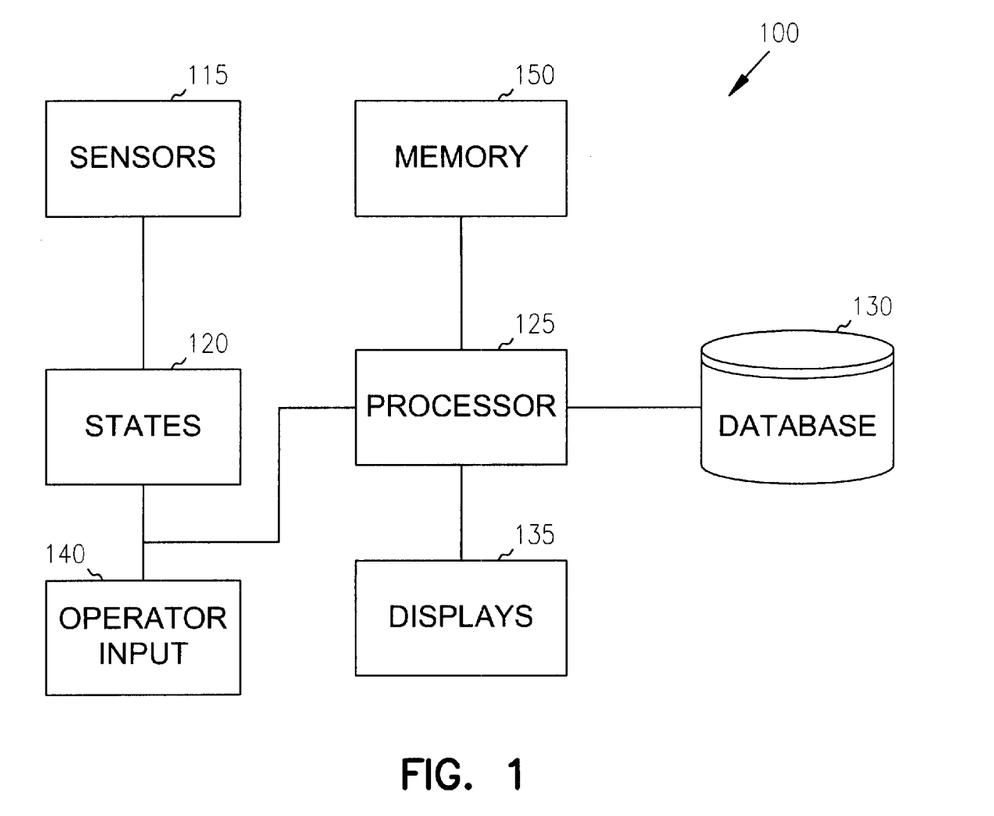
FIG. 1 is a simplified block diagram of a flight safety system utilizing sets of input values.

A system that monitors states of a vehicle such as an aircraft or other vehicle such as a spacecraft, or land-based vehicle is shown at 110 in FIG. 1. A plurality of sensors 115 sense the state of the aircraft, such as airspeed, thrust and many other input values. In one embodiment, over 100 values are sensed. The sensors are coupled to a states module 120 that is integrated with a processor 125, or separate from it. The states module 120 converts physical sensor signals to digital signals if not already in such form for use by the processor 125. Processor 125 is coupled to a database 130. Database 130 contains a record of identified unsafe states, or combinations of values. It receives the sensed values, and queries the records for to identify unsafe or undesired combinations of sensed values. The records in database 130 contain error messages in one embodiment, or other information identifying a mechanism by which to notify an operator of an unsafe condition or state of the aircraft. In one embodiment, database 130 comprises a database server, either integrated with processor 125, or independent from processor 125.

Identified unsafe states are provided back to the processor 125. Processor 125 receives such identifications and associated error messages or other information and provides a corresponding notice to operators via a display 135. Display 135 is used to represent all visual displays, audible alarms, and any other type of mechanism usable for calling operator attention to potentially unsafe conditions.

In one embodiment, inputs defining the state of the aircraft include commands that are pending or being implemented by computers or other devices on the aircraft. Such commands for example include autopilot, autothrottle, flight phase, programmed trajectory and others. The commands are provided by operators of the aircraft, such as a crew, or computer in control of the aircraft. Command values, such as on or off, are provided via a user input mechanism 140. Mechanism 140 is used to represent physical switches, keyboards, buttons and any other type of device usable on aircraft for entering commands, including voice recognition.

A memory 150 or other computer readable medium such as RAM, ROM, tape, disk drive, carrier wave or other memory is coupled to processor 125 to provide storage of data and computer executable code for execution on processor 125. In one embodiment, processor 125, memory 150 and database 130 comprise a standard or modified personal computer, or other type of computer or electronic device capable of carrying out functions associated with the current invention.

Figure 2:
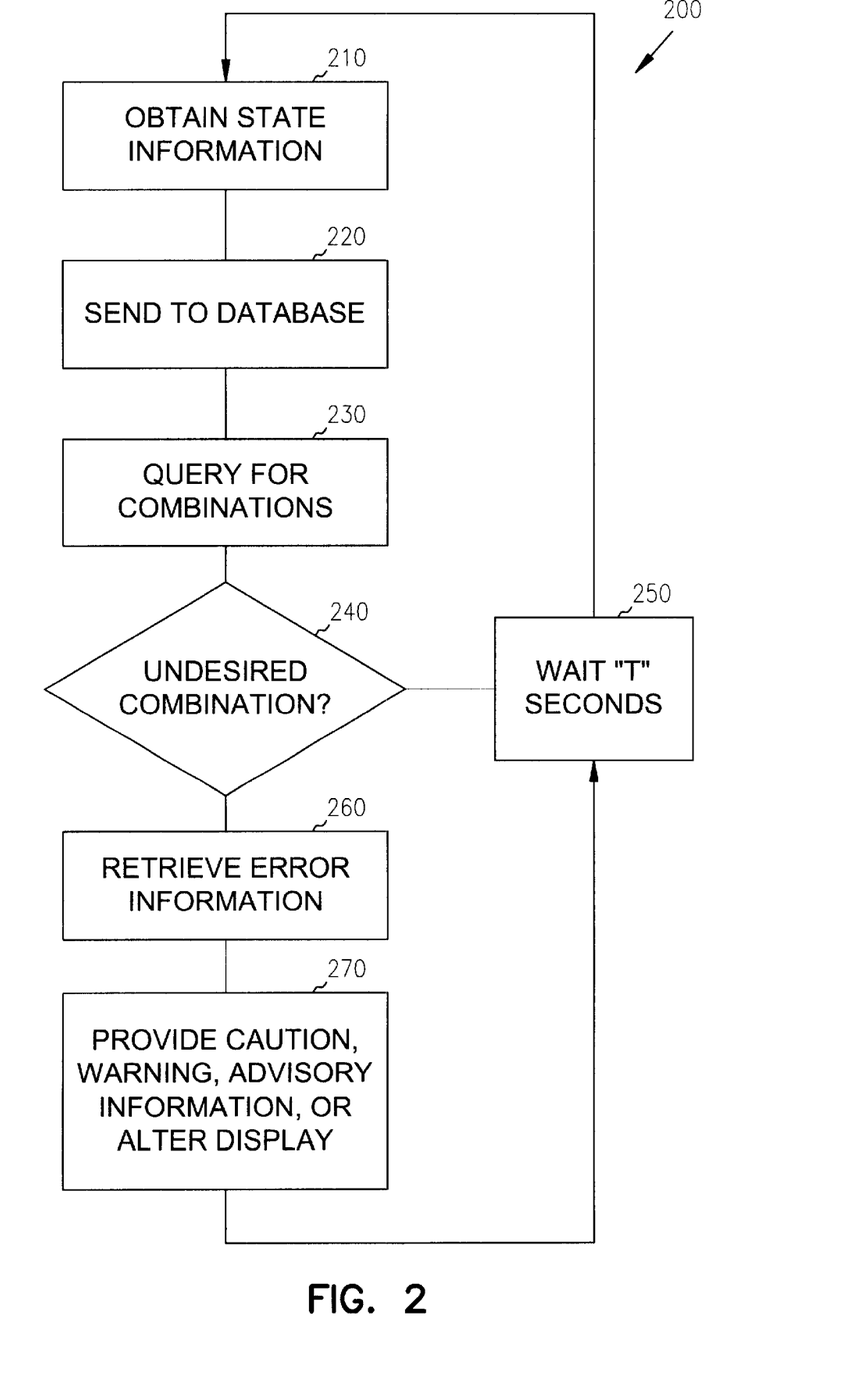
FIG. 2 is a flow chart showing operation of the system of FIG. 1 in comparing combinations of input values to determine unsafe states for an aircraft.

A flowchart representative of functions carried out by one embodiment of the current invention are shown at 200 in FIG. 2. At 210, state information such as input values obtained from the various sensors and commands that are currently in effect in the aircraft is obtained. This information is collected and sent to the database at 220. The database then performs queries to find matches with previously identified potentially unsafe combinations of inputs. In one embodiment, the current state information is stored in a desired database format, and the known unsafe combinations are used as a query against the current state information. In further embodiments, current values defining the state are used to query the known unsafe combination dataset.

In some cases, a combination of two input values may be indicative of a potentially unsafe condition of the aircraft. Whether or not such condition is really potentially unsafe may depend on the value of one or more further input conditions. Thus, many combinations are simply pairs of values, while others actually consist of comparing values of more than two input values. Prior to provision of a warning, query block 230 performs the additional comparison. The comparison is also done at 260 in further embodiments, and the information related to additional values is used to tailor the error information.

If no undesirable combination of values is found at 240, the process waits for a fixed time, T, at 250 prior to starting at 210 again by obtaining then current state information. T may be user selected, or predetermined, and ranges from seconds or minutes to less than a second. Many values do not change rapidly, and T may be a function of how rapidly the values may change.

If one or more undesirable combinations of values are found, error information, such as warnings, or commands for warning mechanisms are retrieved at 260, and at 270, such error information is used to provide cautions, warnings or advisories at 270. Display formats may also be altered, such as by turning on an indicator for one of the states, for instance, a speed brake indicator.

Figure 3:
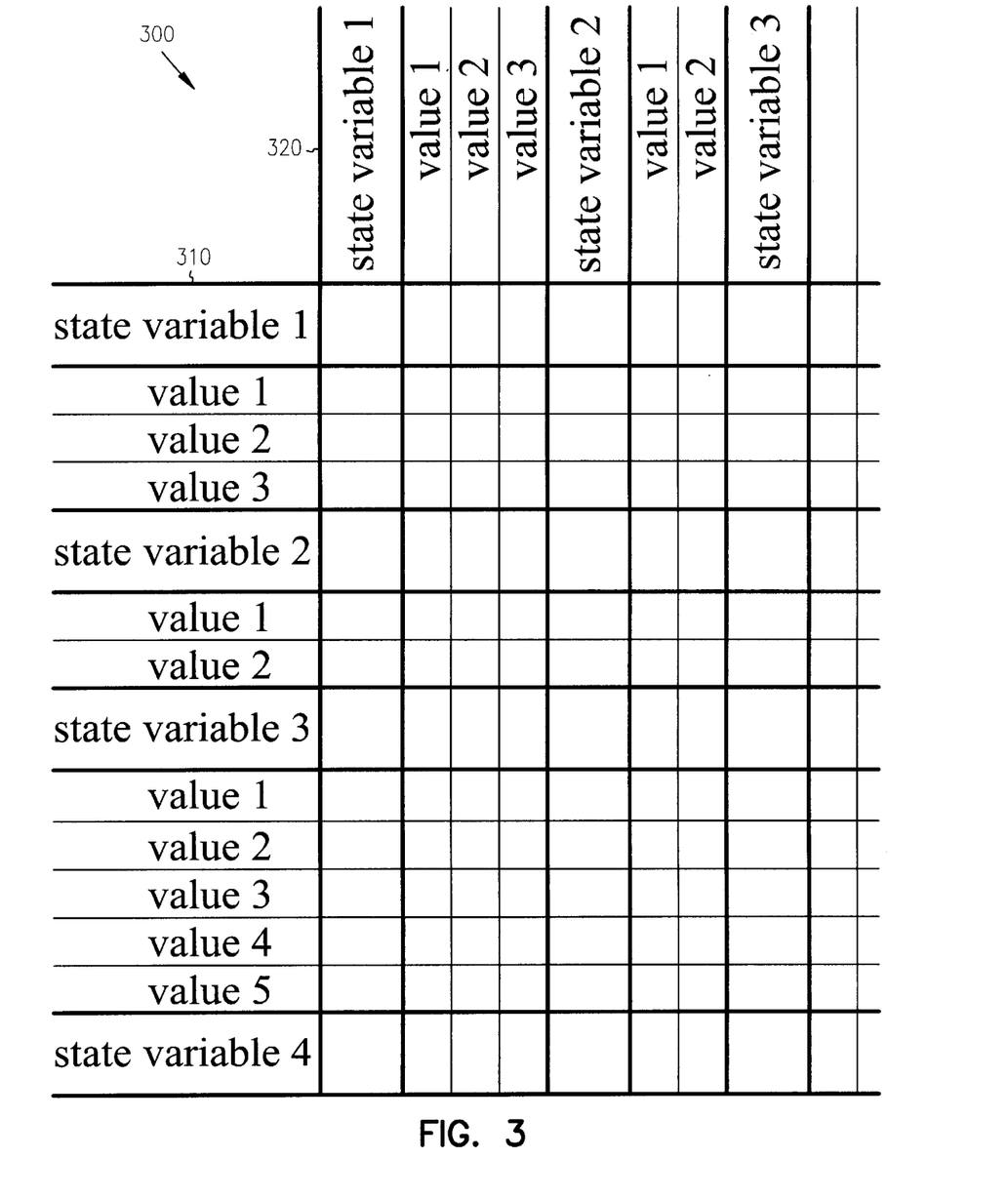
FIG. 3 is a diagram of an analysis structure for analyzing combinations of input variables.

Predetermined undesirable combinations are determined in one embodiment by starting with a matrix shown at 300 in FIG. 3. The matrix consists of a set of rows 310 of state variables with corresponding potential values, and a set of columns 320 of state variables with corresponding values. In one embodiment, the columns and rows are identical, starting with state variable 1 having potential values 1, 2 and 3, state variable 2 having potential values 1 and 2, and further state variables and values. Where the variables correspond to sensed conditions, the values may be quantized, or otherwise characterized, such as by indicating a high, medium, low or very low airspeed. In this embodiment, all potential pairs of values for the variables are identified in the matrix. One or more experts are used to determine whether or not such pairs present a potentially dangerous or otherwise undesirable combination. The experts rely on their own experience, knowledge and education, as well as analysis of previous accidents. By thinking about every possible combination and possible causes and effects, many undesirable combinations or states are methodically identified.

When such undesirable combinations are identified, the experts, or others determine what type of warning or indication to provide to operators of aircraft that encounter such combinations. One type of indication is information advising the operator about the conflict. Another indication informs the operator to ignore a reading. Such an indication will save operators from cutting engine speed on takeoff due to faulty thrust readings. Thus, when low acceleration in combination with medium or high thrust readings are detected, the operator may be warned to abort take-off, or ignore the high reading and rely on other readings, such as ground or air speed.

Upon identification of such unsafe combinations, the database of unsafe combinations is generated. If such unsafe combinations depend on other input values, or if the type of information communicated to an operator is dependent on other input values, this is incorporated into the database in the form of further embedded queries or other mechanism to trigger such further comparisons.

Figure 4:
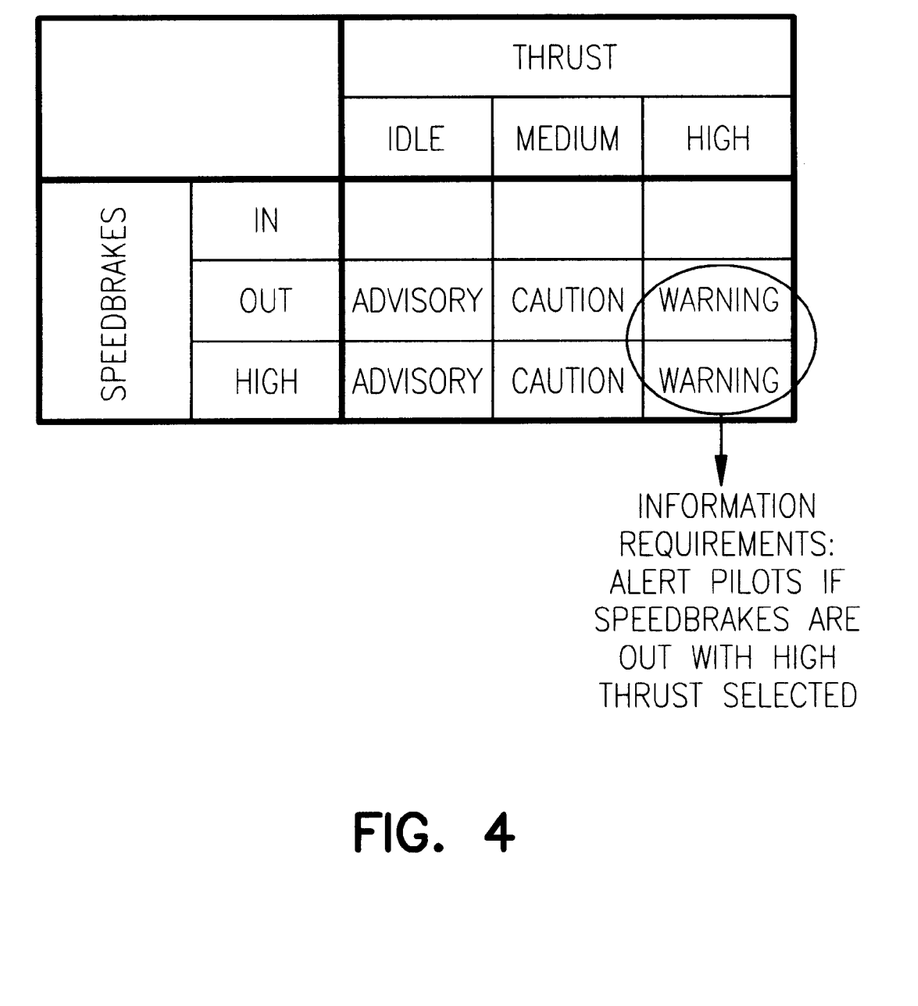
FIG. 4 is a diagram of a comparison of one pair of variables (speedbrakes and thrust) for different values of the variables.

One example of an undesirable combination of variable values is shown in FIG. 4. A combination of a high level of thrust and deployed speedbrakes is not one that a pilot would intentionally choose. Such a combination has been responsible for several tail strike landings when pilots deploy the speedbrakes to acquire the glideslope, then forget that they are out and attempt to maintain the glideslope with high levels of thrust and pitch. As seen in FIG. 4, the speedbrake variable has three potential values, in, out and high. Thrust also has three values, idle, medium and high. If the speedbrakes are out or high, different levels of alarm are provided, from advisory information, caution information and an actual warning when thrust is high.

Variables have values referred to as input values. The input values need to be translated to a form usable by the system. In one embodiment, an aircraft signal definition language is used to identify the input values and describe logic usable by a monitor function to determine unsafe states of the aircraft or other vehicle.

Figure 5:
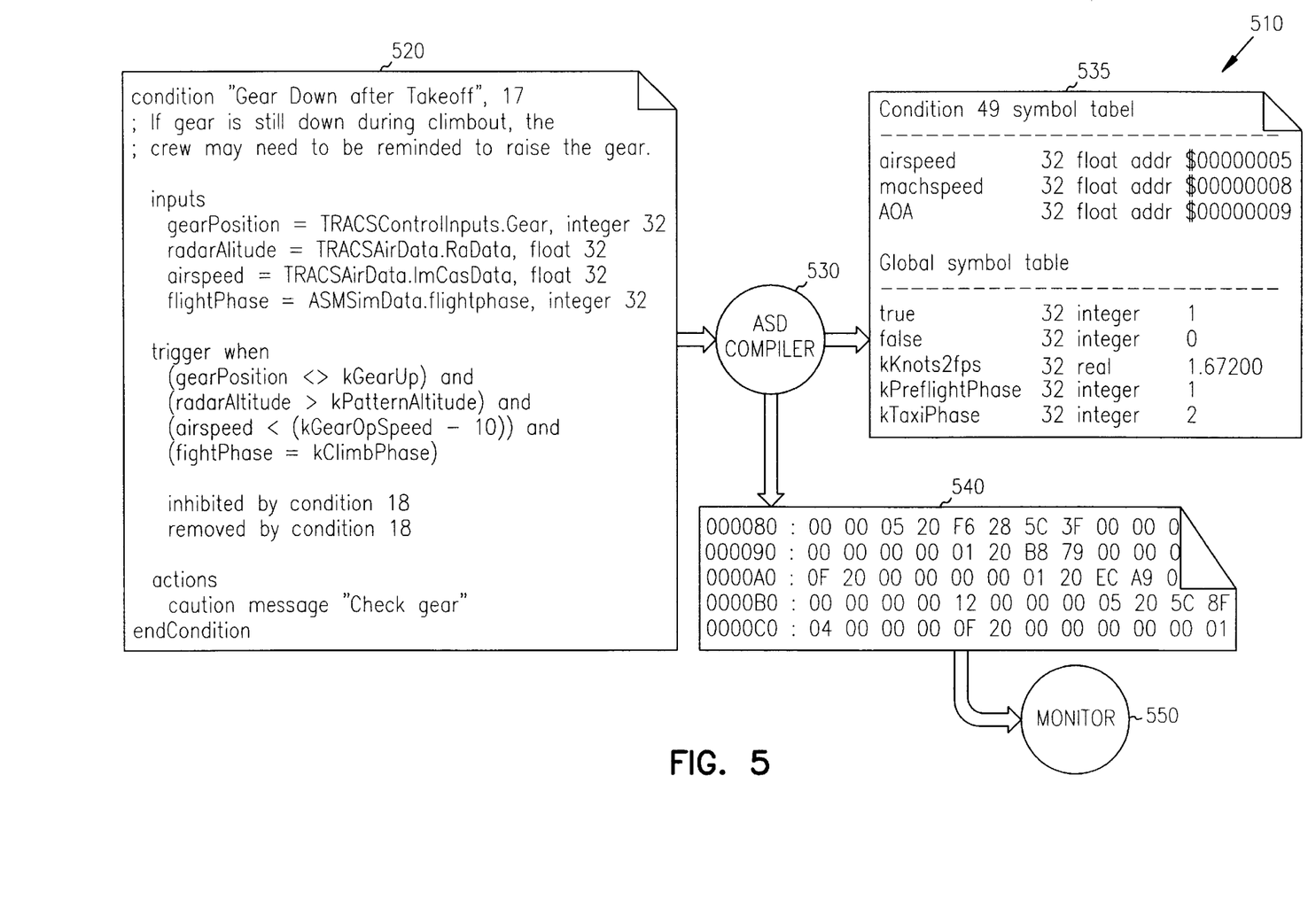
FIG. 5 is a block diagram of a system for generating and using aircraft signal definitions.

A block diagram of an aircraft situation monitor is shown at 510 in FIG. 5. The monitor 510 comprises an aircraft signal definition 520 describing the input values from a selected aircraft. The aircraft signal definition 520 is a high level computer readable language description of one particular aircraft in one embodiment. It is created by any type of text editor or special application program designed to assist in easily creating such a definition. The aircraft signal definition has a definition of inputs and logic representing the unsafe conditions.

The aircraft signal definition 520 is provided to a compiler 530, which translates the aircraft signal definition 520. Compiler 530 produces a symbol table 535 that is useful for debugging purposes. It also produces a binary representation 540 of the aircraft signal definition 520 to a monitor 550. Monitor 550 is a combination of hardware and software that is stable from aircraft to aircraft in one embodiment. Monitor 550 is implemented in processor 125 in one embodiment, or database 130 in a further embodiment. The functions of monitor 550 are distributed across different hardware and software in a further embodiment.

In one embodiment, the compiler is a single-pass design that generates an intermediate binary code that is interpreted by the monitor 550. It supports conditional compilation, global and local scoping rules for identifiers, and has a user selectable option for generating both little-endian and big-endian numeric values. In one embodiment, the aircraft signal definition is written in a high level, platform independent language. The use of translation to an interpreted language allows compilers to be adapted to different platforms without modifying the high level language. A compiler provides source code for running directly on the platform in further embodiments.

Differences in aircraft are represented by the aircraft signal definition. The aircraft signal definition specifies the source, size and type of input parameters. It also provides the triggering logic that determines when a condition is occurring, timing data associated with the detection and clearing of conditions, the conditions along with which a condition should not trigger, and the actions to be taken when the condition exists. The I/O characteristics of each aircraft type are isolated from the operation software and hardware of the monitor 550. The result is a programming language that is custom designed for the task of describing aircraft I/O and condition evaluation logic for onboard avionics systems. This allows the monitor to be developed and certified one time for use with many different types of aircraft.

Figure 6:
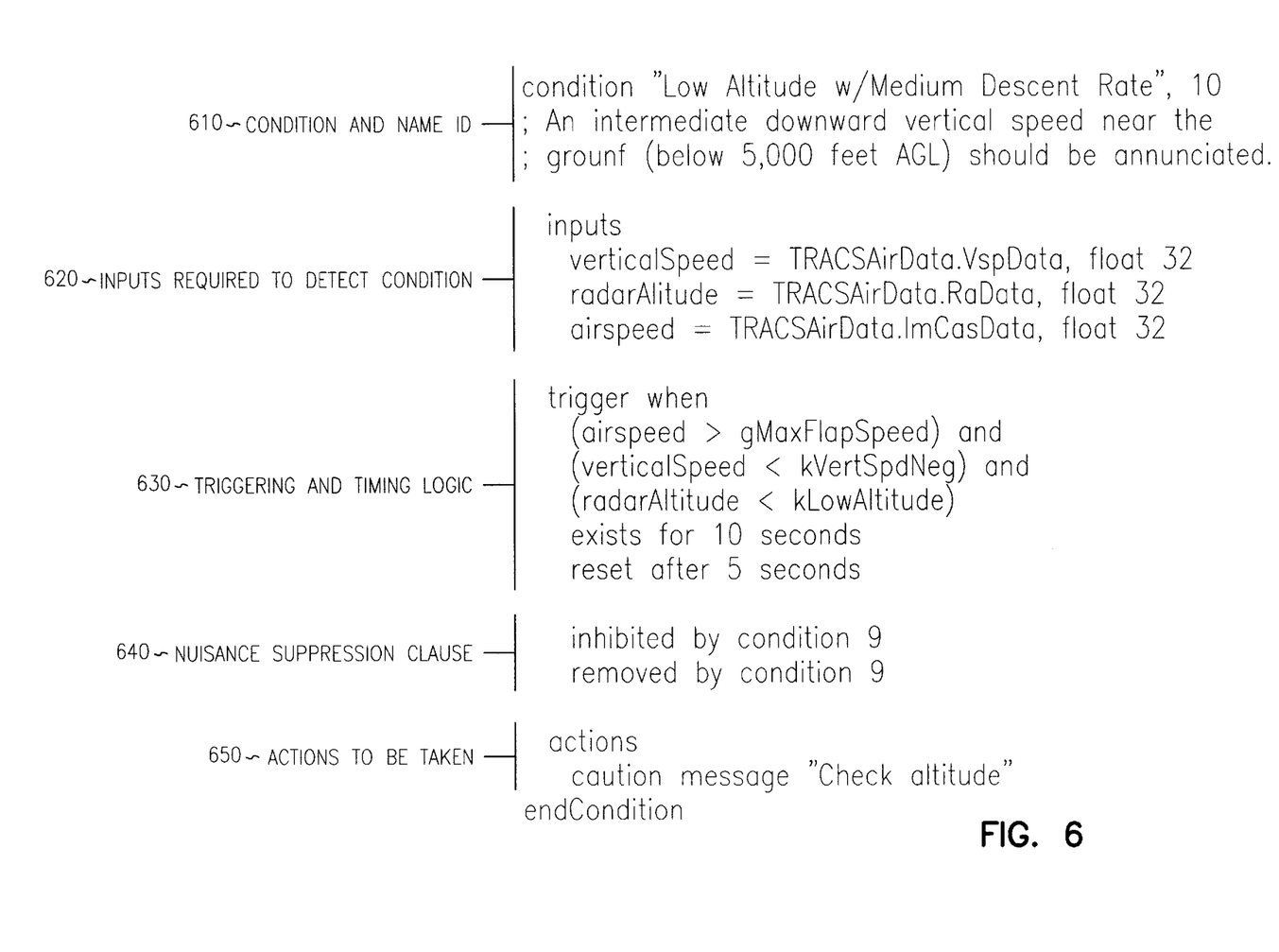
FIG. 6 is a text representation of aircraft signal definition condition clauses.

FIG. 6 shows examples of the condition clauses in an aircraft signal definition. A condition name and ID is indicated at 610. In this particular example, a text name, "Low Altitude w/Medium Descent Rate" name with an ID of "10" is provided. All text after semi colons are comments that are not translated into binary form in one embodiment. Inputs required to detect the previously identified condition are indicated at 620. In the case of condition ID "10", the inputs are vertical speed, radar altitude and airspeed. Triggering and timing logic for the condition are identified at 630. The logic indicates when the condition is satisfied, meaning that a potential dangerous state of the aircraft exists. Each input is compared to a trigger or threshold value. Time for the condition is also specified as needing to exist for at least 10 seconds. The time is reset after 5 seconds.

Occasionally, further conditions indicate that a previously triggered condition should be superceded by another condition. This is illustrated at 640, where if the condition is triggered, it is inhibited and removed if condition ID "9" exists. Finally, at 650, actions to be taken are identified. In this instance, a caution message "Check altitude" is provided.

The aircraft signal definition (ASD) is represented as a text file with a content defined by the diagrams below. Text in the ASD is case-insensitive and white space is not significant. All text on a line that follows a semicolon (that is not embedded in a quoted string), is considered to be a comment and is ignored by the compiler. aircraft_signal_ definition -continued condition_declaration compilation_directive comment condition_name condition_id input_list input_list_item data_location address

-continued bus_name word-offset bit_offset action_list action_list_item user_notification severity quoted_string string range number

-continued identifier value duration time_units expression boolean_expression arithmetic_expression arithmetic_operator boolean_operator The following Backus-Naur Forms (BNF) describe the syntax of the ASD file in a different manner. Given the syntax, design of a compiler is straight forward, as the syntax is easily parsed.

<aircraft_signal_definition>::=asd <aircraft_id_string> {<statement>} endasd
<aircraft_id_string>::=<quoted_string>
<statement>::=<constant_declaration>|<compilation_directive>|
  <condition_declaration> [<comment>]
<constant_declaration>::=constant <identifier> "=" <value>
<condition_declaration>::=condition <condition_name>, <condition_ID>
  inputs <input_list>
  trigger when <boolean_expression>
  [exists for <duration>
  [resets after <duration>]]
  [inhibited by condition ["s"] <condition_ID>
    [{"," <condition_ID>}]]
  [removed by condition ["s"] <condition_ID>
    [{","<condition_ID>}]]
  actions <action_list>
  [repeat after <duration>]
  endcondition
<compilation_directive>::=if <boolean_expression><statement> {<statement>}
  [else <statement> {<statement>}] endif
<comment>::=";" <string> (comments continue until the end of the line)
<condition_name>::=<quoted_string>|<identifier>
<condition_ID>::=<number>|<identifier>
<input_list>::=<input_list_item> {<input_list_item>}
<input_list_item>::=<identifier>"="<data_location>
<data_location>::=discrete <number>|
  bus <bus_name> word <offset> [bit <offset>]|
  <address> "." <address>
  ["," <type_identifier>[<number>]]
<bus_name>::=<quoted_string>|<identifier>
<offset>::=<number>|<identifier>|<range>
<address>::=<number>|<identifier>
<type_identifier>::=scalar|integer|real|float
<action_list>::=<action_list_item>{<action_list_item>}
<action_list_item>::=<user_notification>|log <quoted_string>
<user_notification>::=advisory message|caution message|warning message
  21 quoted_string>
<string>letter|digit|symbol {letter|digit|symbol }
<quoted_string>:: ""<string>""
<range><number>|<identifier>".."<number>|<identifier>
<number>["$"]["-"] digit {digit }|<identifier>
<identifier>letter {letter|digit }
<value><quoted string>|<number>|true false|<identifier>
<duration>::=<number><time_units>|<identifier><time_units>
<time_units>::=second|seconds|minute minutes
<expression>::=<arithmetic_expression>|<boolean_expression>
<boolean_expression>::=true|false|[not]<value>|[not]<identifier>|
  [<open_paren> ]<expression><boolean_operator><expression>
  [<close_paren> ]
<arithmetic_expression>::=
  <number>|<identifier>|<range>|
  [<open_paren>] <arithmetic_expression>
  <arithmetic_operator>
  <arithmetic_expression> [<close_paren>]
<arithmetic_operator>::="+"|"-"|"*"|"/"
<boolean_operator>::="="|"<>"|"<"|">"|"<="|">="|is in| is not in|and|or|not
<open_paren>::="("|"["
<close_paren>:="}"|"]"
<digit>::="0".."9"|"A".."F"
<letter>::=
  "A".."Z"|"a".."z"|"~"|"!"|"@"|"#"|"$"|"%"|"^"|
  "&"|"*"|"-"|"_"|"+"|"="|"|"|"\"|"""|"?"|"/"

Conclusion

A system and method compares combinations of vehicle input values against known combinations of potentially dangerous vehicle input value combinations. Alarms and error messages are selectively generated based on such comparisons. An aircraft signal definition is provided to enable definition and monitoring of sets of aircraft input signals to customize such signals for different aircraft. The input signals are compared against known combinations of potentially dangerous vehicle input values by operational software and hardware of a monitoring function. The aircraft signal definition is created using a text editor or custom application.

A compiler receives the aircraft signal definition to generate a binary file that comprises the definition of all the input signals used by the monitoring function. The binary file also contains logic that specifies how the inputs are to be interpreted. The file is then loaded into the monitor function, where it is validated and used to continuously monitor the condition of the aircraft.

Undesirable combinations of input values for an aircraft are initially identified by experts. Error messages and identification of potential alarms are generated based on both knowledge of actual accidents, and on use of expert knowledge to predict potentially dangerous states. Multiple input signals such as two or more input signals are compared in further embodiments. The combinations are entered into the aircraft signal definition for use by the monitoring function. Different aircraft signal definition are written for different aircraft, and are useable with monitoring functions that need not be changed. The actual definitions described are but one of many such definitions may easily be substituted or derived using the teaching of the present application.

What is claimed is:

1. A method of determining unsafe conditions for an aircraft, the method comprising:

describing combinations of conditions of the aircraft that represent potentially unsafe conditions in a computer readable language;

compiling the description to a binary form;

loading the binary form on a monitor;

receiving multiple input signals representing the condition of the aircraft; and operating the monitor to identify unsafe conditions.

2. The method of claim 1 wherein the description of combinations of conditions are tailored to each aircraft.

3. The method of claim 1 wherein the description of combinations of conditions comprises multiple combinations of conditions including I/O descriptions, values, and expressions.

4. The method of claim 3 wherein the expressions comprise arithmetic or Boolean expressions.

5. The method of claim 1 wherein the description of combinations of conditions comprise inhibitors based on further conditions.

6. A method of initializing a monitor that identifies unsafe conditions for an aircraft, the method comprising:

creating an aircraft signal definition representative of combinations of conditions of the aircraft that represent potentially unsafe conditions;

translating the description to a binary form; and loading the binary form on the monitor for identifying unsafe conditions.

7. The method of claim 6 and further comprising adding identification of inputs and triggers for unsafe conditions to the aircraft signal definition.

8. The method of claim 7 wherein the aircraft signal definition further comprises identification of unsafe condition dependent actions to be taken.

9. The method of claim 6 and further comprising adding a nuisance suppression clause to the aircraft signal definition.

10. The method of claim 6 and further comprising adding multiple condition names and IDs to the aircraft signal definition.

11. A computer readable medium having instructions for causing a computer to execute a method of determining unsafe conditions for an aircraft, the method comprising:

describing combinations of conditions of the aircraft that represent potentially unsafe conditions in a computer readable language;

compiling the description to a binary form;

loading the binary form on a monitor;

receiving multiple input signals representing the condition of the aircraft; and operating the monitor to identify unsafe conditions.

12. The computer readable medium of claim 11 wherein the description of combinations of conditions are tailored to each aircraft.

13. The computer readable medium of claim 11 wherein the description of combinations of conditions comprises multiple combinations of conditions including I/O descriptions, values, and expressions.

14. The computer readable medium of claim 11 wherein the description of combinations of conditions comprise inhibitors based on further conditions.

15. The computer readable medium of claim 11 wherein the method further comprises obtaining the values of conditions from sensors.

16. The computer readable medium of claim 11 wherein one condition comprises a command.

17. A computer readable medium having instructions for causing a computer to execute a method of initializing a monitor that identifies unsafe conditions for an aircraft, the method comprising:

creating an aircraft signal definition representative of combinations of conditions of the aircraft that represent potentially unsafe conditions;

translating the description to a binary form; and loading the binary form on the monitor for identifying unsafe conditions.

18. The computer readable medium of claim 17 wherein the method further comprises adding identification of inputs and triggers for unsafe conditions to the aircraft signal definition.

19. The computer readable medium of claim 18 wherein the aircraft signal definition further comprises identification of unsafe condition dependent actions to be taken.

20. The computer readable medium of claim 17 wherein the method further comprises adding a nuisance suppression clause to the aircraft signal definition.

21. The computer readable medium of claim 17 wherein the method further comprises adding multiple condition names and IDs to the aircraft signal definition.

22. A computer readable medium having a data structure used to determine unsafe states of an aircraft, the data structure comprising:

identifications of multiple conditions;

identifications of inputs corresponding to the conditions; and triggers specifying triggering values for combinations of inputs.

23. The computer readable medium of claim 22 and further comprising identifications of actions to be taken based on combinations of predetermined input values.

24. The computer readable medium of claim 22 wherein the inputs correspond to sensor readings from the aircraft.

25. The computer readable medium of claim 24 wherein selected inputs correspond to commands provided by operators of the aircraft.

26. The computer readable medium of claim 22 and further comprising inhibitors describing conditions that inhibit triggers.

27. The computer readable medium of claim 22 wherein the elements of the data structure a modifiable for each different type of aircraft.

28. The computer readable medium of claim 22 wherein the triggers comprise arithmetic or Boolean expressions.

29. A system that determines unsafe states for a vehicle, the system comprising:
- a machine readable representation of combinations of triggers and conditions of the vehicle that represent potentially unsafe states;
- a translator that converts the description to a binary form;
- a plurality of input signals representing the state of the vehicle; and
- a monitor that receives the input signals and executes the binary form of the description to determine actions when an unsafe state is detected.

* * * * *